April 15, 1969     S. L. LINDT ET AL     3,438,122
METHOD OF MANUFACTURING AN ELECTRICAL COIL ASSEMBLY
Original Filed Nov. 1, 1962
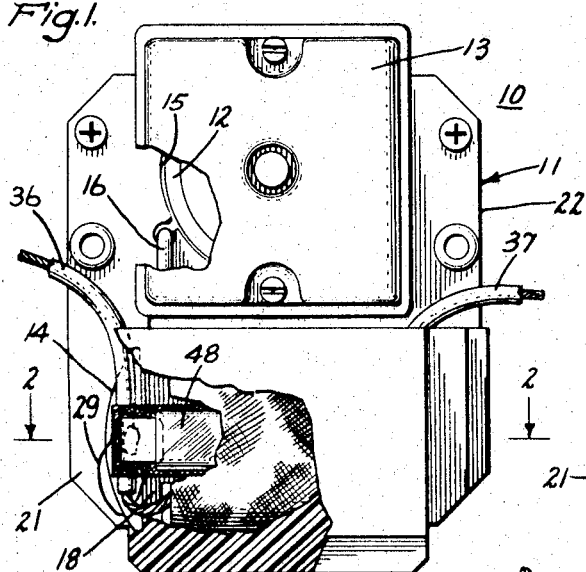
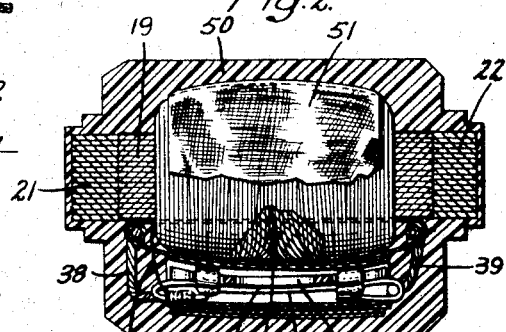
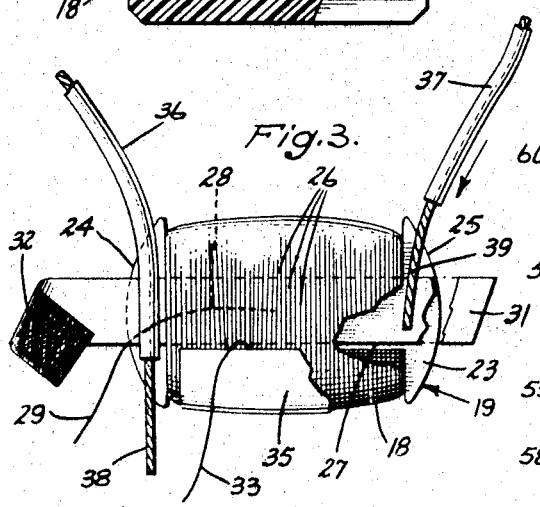
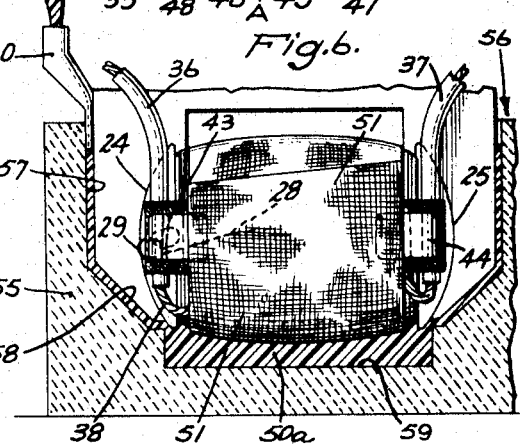
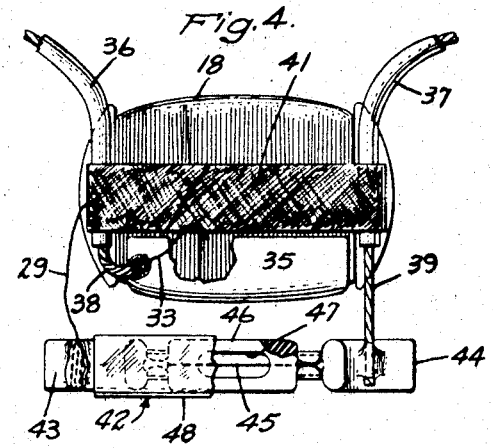
Inventors:
Stanley L. Lindt,
Clarence W. Woods, Jr.
by John M. Stoudt
Attorney.

United States Patent Office 3,438,122
Patented Apr. 15, 1969

3,438,122
METHOD OF MANUFACTURING AN ELECTRICAL COIL ASSEMBLY
Stanley L. Lindt and Clarence W. Woods, Jr., Fort Wayne, Ind., assignors to General Electric Company, a corporation of New York
Original application Nov. 1, 1962, Ser. No. 234,713, now Patent No. 3,200,273, dated Aug. 10, 1965. Divided and this application Mar. 30, 1965, Ser. No. 443,883
Int. Cl. H02k 15/14, 15/16; B29f 1/10
U.S. Cl. 29—596        2 Claims

ABSTRACT OF THE DISCLOSURE

A method of manufacturing an electrical coil assembly to produce an enclosed stator for an A-C motor. A stator coil is wound on a core section and is connected in series between an enclosed fusible link and first and second lead conductors. A sheet of heat-resistant material is wrapped around the coil to totally enclose it and secure the fusible link thereto. An imperforate coating is then formed over the link and coil with the conductor leads projecting therefrom in order to provide an enclosed stator winding.

*Background of the invention*

The present invention relates in general to methods of manufacturing coil assemblies and dynamoelectric machine components and more particularly to an improved method of manufacturing small motor stators for use in applications where enclosed electrical components are desired. This application is a division of our copending application Ser. No. 234,713 filed Nov. 1, 1962, now Patent No. 3,200,273, issued Aug. 10, 1965.

In certain applications for small electric motors, it is desirable, if not necessary, that the electrical components, i.e., the windings and their connections, be enclosed from the surrounding atmosphere. For example, fractional horsepower motors are used today in many domestic refrigerators to drive air circulating fans, and both to protect the motor itself and to avoid hazard, it is necessary that the motor windings be effectively separated from the surrounding atmosphere. Considerable condensation of moisture occurs within the refrigerator and since the condensate may drip or otherwise come into contact with the motor, a waterpoof casing should be provided for the windings to prevent shorting or grounding by the condensate. Also, since any electrical winding is liable to failure over an extended period of time, refrigerators being used upwards of fifteen to twenty years, the motor windings should be encased to prevent the escape of molten copper if failure should occur after years of service. Obviously, if molten copper could escape into the refrigerator, a considerable fire and personal hazard would be created. The same considerations hold true for any flames or sparks occurring upon motor failure, which should also be prevented from escaping into the surrounding environment.

A traditional approach generally followed by fractional horsepower motor manufacturers for these applications where the electrical components of the motor must be separated from the surrounding atmosphere is to encase the motor completely with a metal enclosure. In other words, the motor housing surrounds the rotor and the stator with no openings whatsoever except for the output shaft. These motors are known as totally enclosed motors and they do result in acceptable protection of the windings and elimination of hazard upon winding failure. But they are quite expensive as compared to an open motor and in addition they have several inherent disadvantages. Their size and bulk is increased as compared to an open motor, which sometimes makes them more difficult to use where space is at a premium. Also, and probably most important, the normal ventilation system for open motors wherein the heat generated in the windings is dissipated to a stream of air passed through the motor cannot be used. With the lack of adequate ventilation, the motor temperature necessarily rises and consequently the life of the winding insulation is adversely affected. Also, the lubrication properties of the oil supplied to the shaft bearings are reduced due to the higher temperature of operation.

A recent innovation, tending to overcome the shortcomings of the traditional approach, is the one in which, among other things, only the windings are enclosed in an imperforate covering, such as that disclosed and claimed in the U.S. patent application of Hugo C. Kaeding, Ser. No. 58,954, filed Sept. 28, 1960, now Patent No. 3,196,297, issued July 20, 1965, and assigned to the same assignee as the present invention. The instant invention is related to their latter approach.

*Summary of the invention*

Accordingly, it is the primary object of our invention to provide an improved method of manufacturing a coil or winding assembly for use in an application where enclosed electrical components are desired, wherein only the windings are enclosed as contrasted to the entire electrical inductive device.

It is a more specific object of our invention to provide an improved method of manufacture of a dynamoelectric machine having stator windings effectively protected from moisture and from the escape of molten copper and flame upon failure, and having a self-contained motor protection arrangement without increasing the size or bulk of the machine unnecessarily.

A further specific object of our invention is to provide an improved method of manufacturing electric motor stators for use in applications requiring enclosed electrical components, which is not only less expensive to manufacture than a totally enclosed motor of equivalent output, but also insures a fail-safe type of motor.

It is a further object of our invention to provide an improved method of manufacturing a core assembly especially suitable for use in a stator which does not require skilled personel to practice, yet results in an improved structure.

Briefly stated, in accordance with one form of our invention, we provide an improved method of manufacturing an electric motor stator for service where enclosed electrical components are desired, in which a winding formed of a number of turns of metallic wire having an adherent coating of insulating material, is provided on the stator core. A pair of insulated lead conductors adapted to be connected to a power source, each having a stripped end, are held adjacent the winding, one on either side thereof, with one of the stripped ends being electrically joined to one side of a fusible assembly which overlies the winding and is in series circuit with the winding through its other side. This other side is, in turn, attached to one end of the winding. The opposite winding termination is electrically joined to the stripped end of the second lead conductor to complete the winding circuit. Preferably the fusible assembly includes an air pocket surrounding a fusible part of the assembly for receiving the fusible part upon failure thereof and has an adhesive insulating strip enclosing the pocket as well as providing means for insulating the electrical connections of the assembly from the winding itself, the connections being bent back over the strip. In addition, the electrical connections are all in spaced relation with reference to one another to minimize any short circuiting possibility.

A sheet of heat-resistant material having small recesses is wrapped around the winding and fusible assembly, with the recesses facing away from the winding. An imperforate protective covering is then formed, as by molding heat-responsive or heat-hardenable resin, in intimate contact with the sheet and exposed peripheral winding surfaces, such that the winding, fusible assembly, and sheet are encompassed and the two lead conductors project through and beyond the covering for connection to a suitable power source.

The subject matter which we regard as our invention is particularly pointed out and distinctly claimed in the concluding portion of this specification. Our invention, however, both as to organization and method of operation, together with further objects and advantages thereof, may be best understood by reference to the following description taken in conjunction with the accompanying drawing.

*Brief description of the drawing*

FIGURE 1 is an elevational view of a small electric motor which embodies a coil assembly manufactured by the preferred form of our invention, the view being partially broken away to show details;

FIGURE 2 is a cross-sectional view taken along the line 2—2 of FIGURE 1 and illustrates one form of the motor protection system produced by the preferred form of the present invention;

FIGURE 3 is an elevational view of the coil supporting core showing the placement of external leads on either side of the winding subsequent to the winding operation;

FIGURE 4 is a view similar to that of FIGURE 3 illustrating the connection of the external leads to the winding;

FIGURE 5 is a similar view to FIGURE 4 illustrating the component parts of the coil support core in position preparatory to the formation of an imperforate outer covering encompassing the winding; and FIGURE 6 is an elevational view, partly in section, of the motor with the core and winding in place shown as the outer covering is being applied to the winding.

*Description of the preferred embodiment*

Referring now to the drawing, and in particular to FIGURES 1 and 2, we have shown therein an electric motor 10 which incorporates a stator manufactured by one form of our invention. The motor 10 is of the shaded pole type and it includes a stator 11 and a rotor 12. The rotor 12 is suitably supported for relative rotation with stator 11 by a pair of bearing assemblies 13 (one shown in FIG. 1) which are secured to the stator. A pair of oppositely disposed pole faces provided on the stator, one of the pole faces being shown at 15, form a rotor receiving bore wherein the rotor is activated during operation by means of the magnetic flux passing between these pole faces. Suitable shading coils are provided at the trailing ends of the stator pole faces to provide starting torque and to aid in producing running torque. For example, the shading coils for the pole face 15 may comprise a pair of copper rings such as are indicated at 16 and it will be understood that similar coils are mounted diametrically opposite on the other pole face.

The magnetic flux for exciting the rotor 12 is provided by an electrical winding or coil 18 which is mounted on a core section or winding leg 19 of the stator. Winding leg 19 bridges and is in tight engagement with depending legs 21 and 22 of the stator yoke section and serve to complete the flux path between the winding legs and the pole faces.

As is best seen in FIGURE 2, both winding leg section 19 and the main portion of the stator are formed of a plurality of stacked laminations of magnetic material. The winding leg 19 is furnished separately from the rest of the stator and is pressed into position between the legs 21 and 22 after the coil 18 has been wound thereon. The press fit between the winding leg 19 and the depending legs 21 and 22 is sufficient in itself to keep winding leg 19 in place with no additional securement being required. It will be understood that the rotor 12 may also be formed of a plurality of stacked laminations of magnetic material with a squirrel cage winding of conductive material being provided in slots formed therein in the usual manner.

Before describing further details of motor 10 and the preferred arrangement by which we make the motor both fail-safe and moisture proof, we will outline the improved method for assembling and enclosing the electrical components of motor 10. Referring to FIGURE 3, winding leg 19 is illustrated after an electrical insulating layer 23 has been hardened on its outer faces, with the exception of the arcuate surfaces 24, 25 which are adapted to engage complementary edges at depending legs 21, 22. Preparatory to the winding operation in which coil forming wire 26 is deposited in successive turns around axial section 27 of leg 19, either in random or precision wound fashion thereon by a conventional coil winding machine (not shown) a start wire end 28 is initially placed along the central axial section 27, with wire extremity 29 projecting beyond arcuate surface 24 of the leg. A piece of insulating tape 31 having an adhesive side 32 is then positioned over wire length 26 such that adhesive side 32 faces section 27 to retain the wire end 28 on the section during the winding operation. Upon completion of the coil forming operation, the wire running to the coil winding machine is severed and a short strip of suitable adhesive insulating strip 35 is preferably disposed on top of coil 18 over the severed finish wire end 33 to hold end 33 temporarily in place for subsequent fabricating procedures.

External insulated lead conductors 36, 37 for connecting coil 18 to a suitable power source, such as an alternating current energizing source, are arranged at opposite sides of the coil so that bare lead terminations or stripped ends 38, 39 lie beyond the edge of tape 31. The ends of tape 31 are then brought tightly about the leads until the tape ends overlap to permit them to be firmly pasted together, denoted at 41, with the tape encircling the leads and one winding side of the coil and leads in the manner revealed in FIGURE 4 for holding the leads in place. It will be observed in FIGURE 4 that as illustrated, adhesive surface 32 of tape 31 is disposed away from the peripheral surface of the coil.

Referring now more specifically to FIGURE 4, we have shown the preferred way in which we connect coil 18 to leads 36, 37. Lead termination 38 of lead 36 is soldered or otherwise electrically joined to finish wire end 33 while the other lead 37 is attached to start wire end 29 through the intermediary of a series connected fusible assembly 42. In the illustrated form, assembly 42 comprises a pair of separated electrically conducting extensions 43, 44 and a fusible wire portion 45 suitably mounted on insulator 46, overlying insulator opening 47, linking the extensions together. Electrically joined, as at soldered connection 38, to extension 43 is start coil wire end 29; lead termination 39 is similarly connected to extension 44. A rectangular sheet of adhesive insulation 48 in tape form, similar in composition to tape 31 and dimensionally longer than the length of wire 45, is wrapped around fusible wire 45 and insulator 46 and, together with insulator opening 47, provides an air pocket to receive the flow of material when wire 45 melts or flashes under adverse operating conditions, to be further explained below. Each end of extensions 43, 44 carrying the electrical joint with wires 29 and 39 respectively is folded back over insulation 48, and in the manner shown by FIGURE 5 assembly 42 is pressed onto adhesive tape surface 32, which holds the assembly in position adjacent the outer surface of the coil.

Preparatory to the formation of an impervious outer covering 50 for enveloping coil 18 in a manner to be subsequently explained, we prefer to wrap a sheet of heat resistant material tightly around coil 18 and fusible assembly 42. The sheet is identified by numeral 51 in FIGURE 6, formed by way of exemplification of glass fibers to provide a latticed or rough appearance on one side and an adhesive surface provided on the other, with the rough surface facing outwardly in overlapping end to end relation. Material 51 assists in retaining bent extensions 43, 44 firmly against insulation strip 48 thereby minimizing any chance of their displacement when the coil supporting core is pressed into proper position between stator legs 21, 22, the final assembly step prior to the provision of imperforate covering 50. In addition, the latticed surface of the material furnishes a matrix of small recesses for implementing the formation of the imperforate outer covering 50, to be described hereinafter in connection with the molding operation illustrated in FIGURE 6.

It will be appreciated from the procedure described so far that the coil and core assembly, before it is inserted between stator legs 21, 22, is readily fabricated by simple and inexpensive steps capable of being performed by unskilled personnel. These steps insure the electrical isolation of leads 36, 37 from each other as well as from coil 18 to prevent possible short circuiting which might otherwise occur during the fabrication procedure. Moreover, the components of the coil and core assembly are retained in their relative finally assembled positions and may be transferred as a unit from one work station to another or may be conveniently stored until needed, adding flexibility to the manufacturing process without incurring additional expense by requiring the use of temporary holding equipment such as clamps and the like.

In accordance with the succeeding stage of the process, imperforate covering 50 is formed over sheet 51 to encase or totally enclose coil 18, the lead connections, and fusible assembly 42. This is achieved in the exemplification by a molding operation in which the molding apparatus includes a mold 55 having a cavity 56 open at the top which preferably has the configuration exhibited in FIGURE 6 when employed in connection with the manufacture of the electric motor of the illustrated embodiment. Cavity 56 is formed by vertical side walls 57 and downwardly tapered walls 58 for supporting the legs of the motor and its core and coil assembly in spaced relation with the bottom cavity wall 59. With the motor placed upright in the cavity, we preferably insert a thermosetting resin 50a in an unhardened state, such as uncured epoxy resin XR50508 commercially available from Minesota Mining and Manufacturing Company, through nozzle 60 into cavity 56, the plastic resin flowing over the exposed surfaces of sheet 51, fusible assembly 42, lead terminations 38, 39 and coil 18.

This resin should be compatible with insulating layer 23 disposed on the core and with the insulation of the leads so that resin 50a will adhere to the layer 23 and leads to form, upon curing, a water tight bond therewith, effective to prevent water from leaking into the coil. In addition, the constituents of the insulations must be such that they will not adversely affect covering 50 over a long period of time. It should be noted at this time that with a lead disposed on either side of coil 18 in the fashion illustrated, an unusually large contacting area is provided between the lead outer surfaces and resin 50a to insure an adequate bond therebetween even though covering 50 may be thin in cross section area.

The resin is then cured in place, by the application of heat such as passing the mold and motor through an oven, so as to form a uniform imperforate or substantially void free covering 50 in intimate bonding contact with the core components just named. The rough surface provided by the recesses of sheet 51 will assist in providing this intimate bonding contact for the covering. Upon hardening of the resin, the motor may be conveniently removed from the mold cavity, and if desired, dipped in varnish to deposit a layer of varnish over the covering 50 to assist in keeping moisture out of the coil when the motor is used under extreme conditions; e.g., the coil being submerged in water.

Turning now to further aspects and additional advantages of the present invention, we are able to insure the fail-safe and explosion free feature not only by producing the motor as previously described, but also by interrelating the insulation coating on the coil wire, fusible assembly 42, and the outer protective covering 50. Specifically, the coil wire is preferably of the type known in the motor industry as "magnet wire" having an outer insulation coating with a predictable melting or failure point in terms of temperature. In actual practice we have satisfactorily utilized Nyleze, a moisture resistant wire produced by the Phelps Dodge Copper Products Corporation which has a polyurethane inner coating and a nylon outer coating to provide the wire with insulation of a predictable melting point between 165° C. and 225° C.

Under normal operating conditions, the hottest part of the coil is located within the coil, approximately one-fourth of the linear distance from the outer surface of the coil toward the magnetic core denoted at A in FIGURE 2. In a motor of the type shown, the temperature differential is normally 60° C. Therefore, if a small ground or short occurs within the wire, the wire insulation will initially deteriorate or melt in the vicinity of A. Initial deterioration will increase the temperature in that location, producing a slight arcing to facilitate shorting of the winding wire, which in turn, causes a sharp and instantaneous rise or surge in the current drawn through leads 36, 37 and the winding of sufficient magnitude to destroy the fusible link. During this short period of failure, there will be an inherent thermal time delay in the heating at cover 50; i.e., its temperature rise lags behind that internally of the coil.

Consequently, by positioning fusible assembly 42 adjacent the outer surface of the coil, preferably overlying the winding surface which is not immediately affected by an over-temperature condition within the coil and further protecting fusible link 45 by tape 48, a link may be chosen which is sensitive to the current surge rather than the internal failing or hot spot temperature, as such, permitting ease of assembly onto the winding. Moreover, the exact value at which the fuse is destroyed is not critical. For instance, with the use of Nyleze wire, the fuse may be destroyed by a current surge in the range of from one to about fifteen amperes. The pocket surrounding the link will act to contain the gases and other byproducts as the link is being destroyed so that, even though assembly 42 is disposed next to cover 50, the cover will not be ruptured by internal winding pressures and may be formed with a minimum cross section or thickness over the coil as little as 1/32 of an inch (exaggerated in the drawing for purposes of clarity) effecting a savings of material used.

In addition, covering 50 may utilize a material having a relatively low deterioration temperature and still avoid failure upon an over-heated condition in the winding. The thermosetting epoxy 50a previously listed by way of example for the covering 50 starts break-down at a temperature in the order of 180° C. without melting or otherwise failing upon the over-heated winding condition, permitting the use of a less expensive yet entirely satisfactory material than has been heretofore possible. Thus, the advantages and features set forth above regarding the preferred form of our invention, provide an improved motor stator which is less expensive to manufacture than a totally enclosed motor construction of equivalent rating.

What we claim as new and desire to secure by Letters Patent of the United States is:

1. A method of manufacturing a dynamoelectric machine stator, including a magnetic yoke section having a pair of pole faces between which a rotor may be inserted and first and second legs depending therefrom to receive a core section, and a core section, for service where enclosed electrical components are desired comprising the steps:

(a) providing a coil formed of a number of turns of metallic wire on said core section;

(b) positioning a pair of insulated leads adjacent the coil, with one of the lead extremities electrically connected to one of the coil ends, with the other lead end electrically joined to one side of a fusible assembly, with the other coil end attached to the other side of the fusible assembly, said fusible assembly overlying the outer periphery of said coil and being insulated therefrom;

(c) wrapping a sheet of heat-resistant material around the coil and fusible assembly to retain the assembly next to the coil periphery;

(d) mounting said core section between said depending legs of said yoke section; and (e) forming a heat-responsive resinous imperforate protective covering in intimate contact with the exposed surfaces of said coil, sheet, fusible assembly, said depending legs and electrical connections, leaving said pole faces of said yoke section uncovered, to provide a moisture proof covering having two leads projecting therethrough in sealed relation for connection to a power source.

2. A method of manufacturing a dynamoelectric wire machine stator for service where enclosed electrical components are desired comprising the steps:

(a) placing the start end of a metallic wire having an adherent coating of insulating material on a stator core, with the end extending beyond the side of the core;

(b) arranging an adhesive insulating tape, of sufficient length to encircle one side of a coil to be wound from said wire, over the start end on the core to maintain the end stationary relative to the core;

(c) winding the wire over a part of the tape and start end to form a coil on the core;

(d) positioning an insulated lead adjacent either side of the coil, folding respective ends of the tape over the leads and disposing the tape ends in engagement with the periphery of the coil beyond the leads, with one of the lead extremities electrically connected to one of the coil ends, with the other lead end electrically joined to one side of a fusible assembly having an air pocket surrounding a fusible part of the assembly adapted to accommodate the part upon melting, and with the other coil end attached to the other side of the fusible assembly;

(e) wrapping a sheet of heat-resistant material having small recesses around the coil and fusible assembly, with the recesses facing away from the coil; and (f) forming a heat-responsive resinous imperforate protective covering in intimate contact with the sheet material recesses and exposed coil periphery; said covering encompassing said coil, sheet and fusible assembly, with said leads projecting through the covering in sealed relation thereto for connection to a power source.

References Cited

UNITED STATES PATENTS

| | | |
|---|---|---|
| 1,482,591 | 2/1924 | Thordarson. |
| 1,863,713 | 6/1932 | Conner _____ 29—602 XR |
| 2,534,119 | 12/1950 | Gethmann _____ 336—205 XR |
| 2,782,283 | 2/1957 | Schwennesen. |
| 2,856,639 | 10/1958 | Forrest et al. _____ 336—205 X |
| 3,027,627 | 4/1962 | Sturdy _____ 29—627 |
| 3,131,331 | 4/1964 | Ray _____ 317—123 |
| 3,145,127 | 8/1964 | Baun. |
| 3,201,646 | 8/1965 | Mansfield _____ 317—15 |
| 3,271,717 | 9/1966 | Gilbert _____ 336—205 X |

JOHN F. CAMPBELL, *Primary Examiner.*

ROBERT W. CHURCH, *Assistant Examiner.*

U.S. Cl. X.R.

29—605; 264—272; 310—45, 68, 71; 336—196, 205.